May 20, 1958 R. O. FEARS 2,835,505
VEHICLE LOAD DISTRIBUTION SYSTEM
Filed May 1, 1956 3 Sheets-Sheet 1
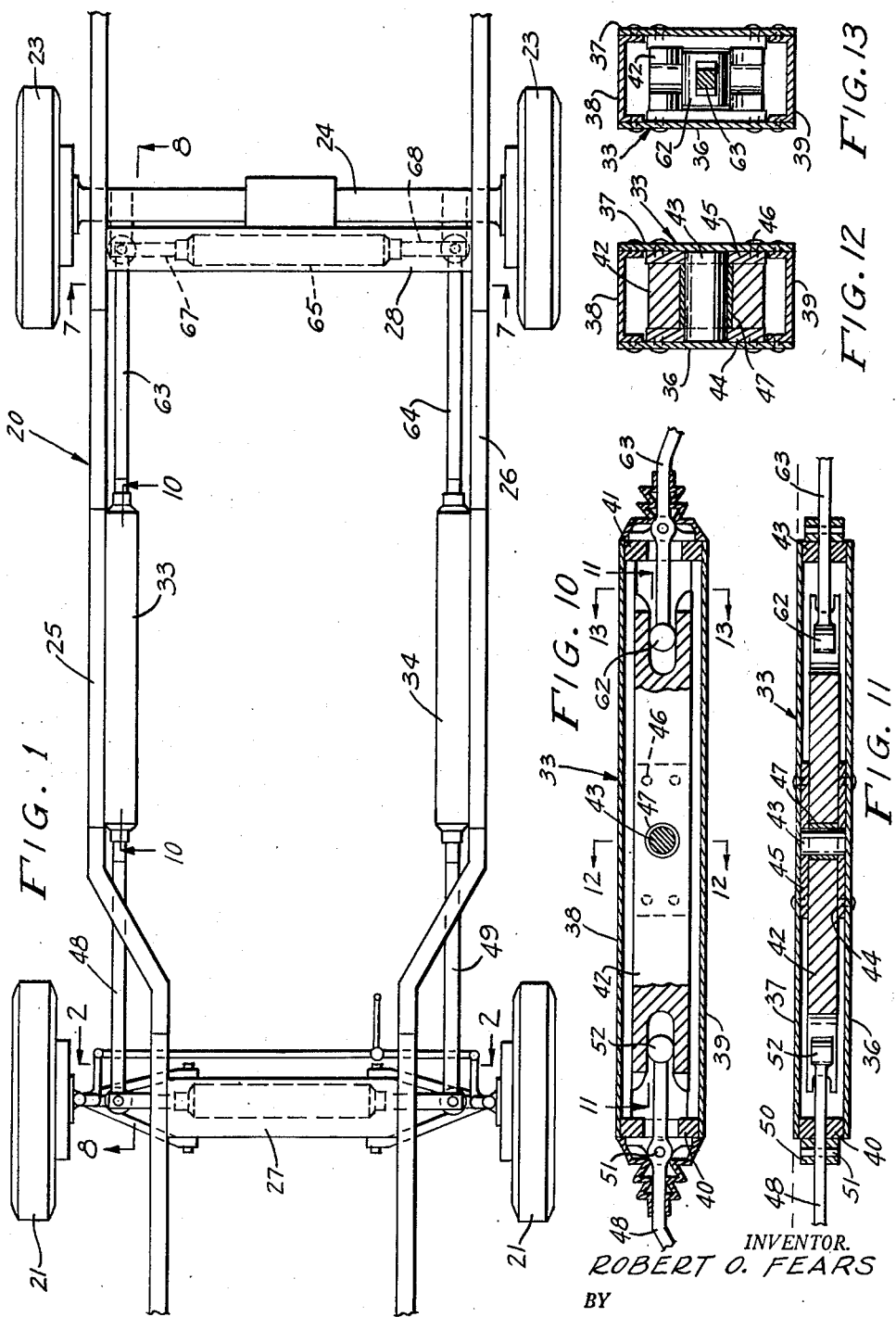
INVENTOR.
ROBERT O. FEARS
BY
McMorrow, Berman + Davidson
ATTORNEYS May 20, 1958 R. O. FEARS 2,835,505
VEHICLE LOAD DISTRIBUTION SYSTEM
Filed May 1, 1956 3 Sheets-Sheet 2
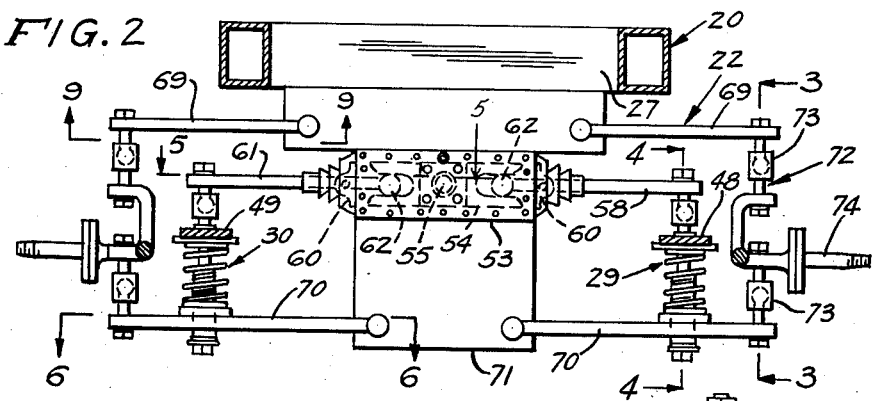
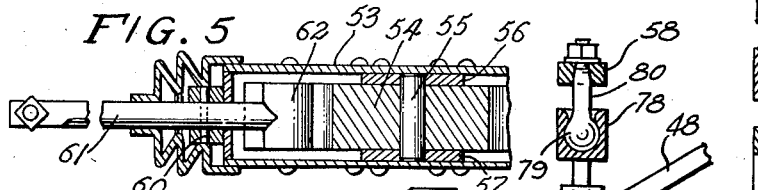
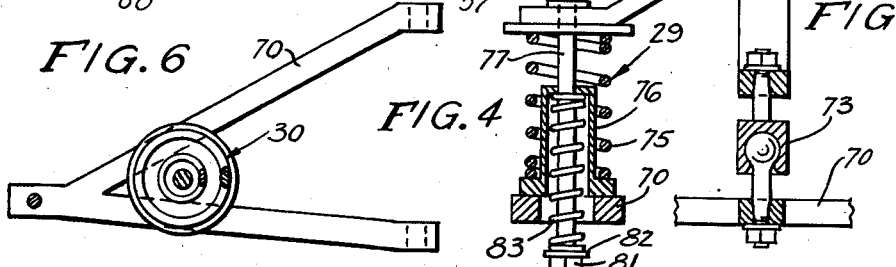
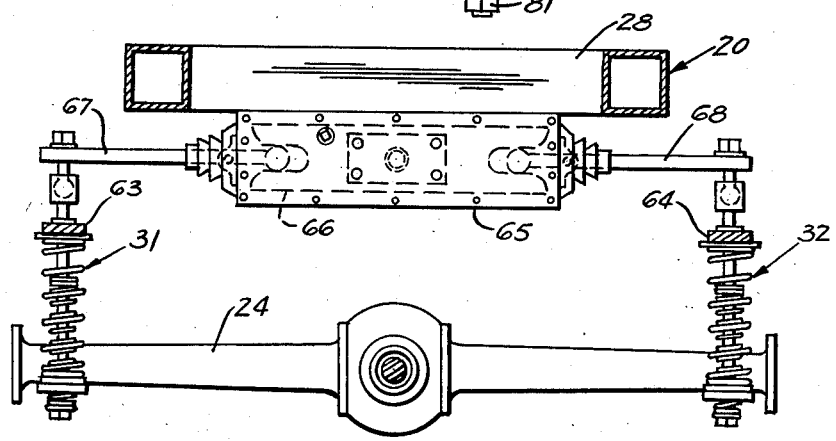
INVENTOR.
ROBERT O. FEARS
BY
McMorrow, Berman & Davidson
ATTORNEYS May 20, 1958  R. O. FEARS  2,835,505
VEHICLE LOAD DISTRIBUTION SYSTEM
Filed May 1, 1956  3 Sheets-Sheet 3
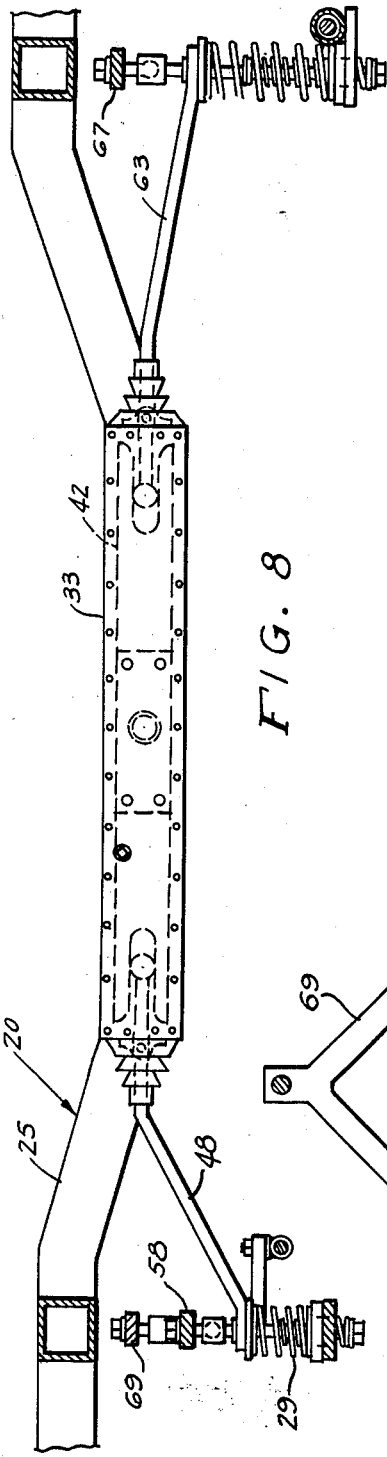
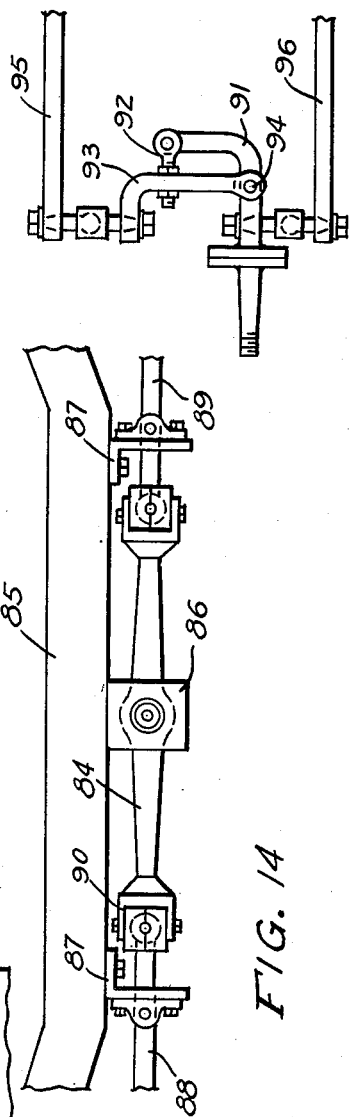
INVENTOR.
ROBERT O. FEARS
BY
McMorrow, Berman & Davidson
ATTORNEYS

# United States Patent Office 2,835,505
Patented May 20, 1958

2,835,505

VEHICLE LOAD DISTRIBUTION SYSTEM

Robert O. Fears, Fort Worth, Tex.

Application May 1, 1956, Serial No. 581,882

3 Claims. (Cl. 280—104)

The present invention relates to vehicles and in particular to a load distribution system for a vehicle wheel suspension.

An object of the present invention is to provide a load distribution system for a vehicle wheel suspension which stabilizes the vehicle body against road shocks due to road surface inequalities and provides a smoother ride for the vehicle passengers.

Another object of the present invention is to provide a load distribution system for a vehicle wheel suspension which lends itself to application to passenger and commercial vehicles and provides a safe and comfortable suspension substantially free from roll, pitch, and wheel bounce, irrespective of load, road surface, and vehicle speed conditions.

A further object of the present invention is to provide a road distribution system for a vehicle wheel suspension which is sturdy in construction, simple in structure, one which eliminates the need for shock absorbers and auxiliary springs, one which is economical to manufacture and install, and one which is highly effective in action.

These and other objects and advantages of the present invention will be fully apparent from the following description when taken in connection with the annexed drawings, in which:

Figure 1 is a plan view of an automobile chassis, showing the present invention installed thereon;

Figure 2 is a sectional view, on an enlarged scale, taken on the line 2—2 of Figure 1;

Figure 3 is a sectional view, on an enlarged scale, taken on the line 3—3 of Figure 2;

Figure 4 is a sectional view, on an enlarged scale, taken on the line 4—4 of Figure 2;

Figure 5 is a sectional view, on an enlarged scale, taken on the line 5—5 of Figure 2;

Figure 6 is a view, on an enlarged scale, taken on the line 6—6 of Figure 2;

Figure 7 is a sectional view, on an enlarged scale, taken on the line 7—7 of Figure 1;

Figure 8 is a sectional view, on an enlarged scale, taken on the line 8—8 of Figure 1;

Figure 9 is a view, on an enlarged scale, taken on the line 9—9 of Figure 2;

Figure 10 is a sectional view, on an enlarged scale, taken on the line 10—10 of Figure 1;

Figure 11 is a sectional view taken on the line 11—11 of Figure 10;

Figure 12 is a sectional view, on an enlarged scale, taken on the line 12—12 of Figure 10;

Figure 13 is a sectional view, on an enlarged scale, taken on the line 13—13 of Figure 10;

Figure 14 is a fragmentary view of the vehicle chassis side frame member, showing another embodiment of the present invention installed thereon; and Figure 15 is a fragmentary elevational view of a portion of the assembly of Figure 2, showing the means for adjusting the camber of the wheel of the vehicle in which the load distribution system of the present invention is employed.

Referring in greater detail to the drawings in which like numerals indicate like parts throughout the several views, the load distribution system of the present invention comprises means for resiliently supporting the vehicle frame designated generally by the reference numeral 20 above a pair of front wheels 21 which are carried on a front wheel assembly 22 and a pair of rear wheels 23 which are mounted on the ends of a rear axle housing 24. The frame 20 includes a pair of spaced side members 25 and 26, a front end member 27 and a rear end member 28. The front wheel assembly 22 is positioned below the front end member 27 and is operatively connected thereto. The rear axle housing 24 is positioned below the rear end member 28 and is separated therefrom.

Upstanding compression springs designated generally by the reference numerals 29 and 30 are carried by the front wheel assembly 22 adjacent each end of the latter and other upstanding compression springs designated generally by the reference numerals 31 and 32 are carried by the rear axle housing 24 adjacent each end thereof.

The means for resiliently supporting the vehicle frame 20 above the front wheels 21 and the rear wheels 23 consists in a casing 33 arranged longitudinally of and fixedly secured to the side member 25 intermediate the ends thereof and another casing 34 similarly positioned with respect to the other side member 26. The casing 33 is shown in section Figures 10 to 13, inclusive, and consists in a front wall 36, a rear wall 37, a top wall 38, a bottom wall 39, and slotted end walls 40 and 41. The casings 33 and 34 are secured by welding or other means to the side members 25 and 26, respectively.

A support 42 is positioned within the casing 33 and is connected intermediate its ends to the casing 33 by means of a shaft 43 which extends through a hole provided in the support 42 and has its ends journaled (Figs. 11 and 12) in a pair of plates 44 and 45 fixed by rivets 46 to the front and rear walls 36 and 37, respectively. A sleeve bearing 47 surrounds the shaft 43 and provides a mounting for the support 42.

The casing 34 contains a similar support as the support 42, similarly positioned and mounted as is the support 42 for rocking movement about the shaft 43 which constitutes a horizontal axis.

A lever 48 is positioned between the front end member 27 and the adjacent end of the casing 33 and is connected inwardly of the end which is adjacent the casing 33 to the casing 33 for rocking movement about another horizontal axis. Another lever 49 is positioned between the front end member 27 and the casing 34 and is similarly mounted on the casing 34. The connection of the levers 48 and 49 to the support within the casings 33 and 34, respectively, is identical and will be described with reference to the lever 48. The connection comprises a pair of bushings 50 fixedly secured to the exterior surface of the end wall 40 of the casing 33 and receives a pivot pin 51 which extends through a hole provided in the lever 48 and constitutes the second horizontal axis. The adjacent end of the support 42 is provided with a slot in which is received a knuckle formation 52 formed on the end of the lever 48.

The lever 48 has its other end extending forwardly and downwardly and secured to the upper end of the coil spring 29, as seen in Figure 2. The lever 49 is similarly positioned and has its end remote from the casing 34 connected to the upper end of the spring 30. The means connecting the levers 48 and 49 to the springs 29 and 30 will be described later.

Another casing 53 is arranged longitudinally of the front end member 27 intermediate the ends thereof and is fixedly secured thereto by welding or by other suitable means. Within the casing 53 is another support 54 similar in construction to the support 42, although of a lesser length, and similarly mounted upon a shaft 55 for rocking movement about the shaft 55, the latter constituting a horizontal axis. The shaft 55 has its ends journaled in the spaced plates 56 and 57 which are fixed to the front and rear walls of the casing 53 in the same manner as the plates 44 and 45 are secured to the front wall 36 and rear wall 37 of the casing 33.

A lever 58 is positioned on the side of the casing 53 adjacent the spring 29 and is disposed longitudinally with respect to the front end member 27. The lever 58 is pivotally connected inwardly of the end which is adjacent to the casing 53, to bushings 60, identical in construction with the bushings 50, heretofore described. The end of the lever 48 is received in the slotted end of the support 54.

Another lever 61 is positioned between the casing 53 and the spring 30 and is similarly mounted inwardly of one end in the casing 53 for rocking movement about a horizontal axis, there being a knuckle formation on the ends of the levers 58 and 61, each received in the adjacent slotted end of the support 54 for transmitting any rocking movement of the levers to the support 54.

As seen in Figures 1 and 8, another lever 63 is positioned between the rear end member 28 and the casing 33 and still another lever 64 is positioned between the rear end member 28 and the casing 34. The levers 63 and 64 are connected inwardly of one end to the casings 33 and 34, respectively, and have their adjacent ends operatively connected to the supports within the casings 33 and 34 for movement with the latter. The levers 63 and 64 are identical and are mounted for rocking movement about horizontal axes in the manner that the levers 48 and 49 are mounted and are similarly connected to the supports to effect their movement. The rearward ends of the levers 63 and 64 are operatively connected to the springs 31 and 32, respectively, as shown in Figure 7.

As seen in dotted lines in Figure 1, and in full lines in Figure 7, another casing 65, similar except for its length to the casings 33, 34, and 53, is positioned longitudinally of and is secured to the rear end frame member 28 intermediate the ends of the latter. Within the casing 65 is another support 66 identical in structure and mounting with the support 42, except for its length. A lever 67 is positioned on one side of the casing 65 and has its free end connected to the spring 31. The other end of the lever 67 is connected to the support 66 in the same manner that the levers 48 and 49 and the levers 58 and 61 are connected to the casings 33, 34, and 53, respectively. On the other side of the casing 65 is another lever 68 similarly connected to the support 66 and to the spring 32.

In Figure 2 is seen the means for attaching the wheels 21 to the front end member 27. Preferably, the front wheel assembly 22 includes an upper arm 69 and a lower arm 70 on each side of the mounting block 71 which is dependingly carried by the front end member 27. The lower arm 70 is shown in plan view in Figure 6 and is of conventional "wishbone" configuration having its ends mounted for swinging upward and downward movement on the mounting block 71. Between the free ends of the arms 69 and 90 is supported a conventionally arranged kingpin assembly designated generally by the reference numeral 72. The assembly 72 includes ball and socket joints 73 and a wheel axle 74 connected between the arms 69 and 70 for pivotal movement about a vertical axis.

In Figure 4 is shown the details of the spring 29, the other springs 30 and 32, inclusive, being of identical construction. The spring 29 includes an outer coil spring 75 circumposed about a cup member 76 having its lower end bearing against the arm 70 and its upper end provided with an opening through which extends a bar 77 having its upper end formed with a socket 78 receiving a ball formation 79 on the end of a bolt 80. The bolt 80 is fixedly secured to the lever 58 at the free end of the latter. The lower end of the bar 77 projects through and is below the arm 70 and has a nut threaded thereon, the nut being indicated by the reference numeral 81 and supporting a washer 82 above which is positioned an inner spring 83 having its upper end received in the bottom of the cut member 76. It will be seen that the coil spring 75 is a compression spring supporting the weight of the vehicle and the inner coil spring 83 is a rebound absorbing member restraining the upward movement of the bar 77.

In Figure 9, one of the upper arms 69 is shown. The arm 69 is bifurcated and Y shaped with its legs pivotally connected to the upper end of the block 71 for moving about a horizontal axis.

In Figure 14, a second embodiment of the invention is shown in which the casing is omitted from the structure and a support 84 is mounted beneath a frame member 85 for pivotal movement about a horizontal axis, the support 84 having its mid-point rockably supported in a bracket 86 which depends from the underside of the frame member 85. L-shaped brackets 87, one on either side of the bracket 86 support levers 88 and 89 inwardly of their one ends for rocking movement about other horizontal axes. The levers 88 and 89 have their adjacent one ends connected to the ends of the support 84 for movement therewith, there being provided box structures 90 on each end of the support 84 receiving the free ends of the levers 88 and 89.

In Figure 15 is shown a modification of the front wheel assembly in which means is provided for adjusting the camber of the wheel of the assembly. Specifically, this means includes an L-shaped axle member 91 having a threaded member 92 extending through the wheel spindle support 93 and adjustably connected thereto for tilting movement about a horizontal axis, the axis being a pin 94 pivotally connecting the free end of the wheel spindle support 93 to the L-shaped axle member 91 intermediate the ends of the latter. An upper arm 95 and a lower arm 96 complete the assembly and are suitably secured to the vehicle front end assembly in the first form of the embodiment shown in Figure 2 and heretofore described. The load distributing system of the present invention above described and illustrated in the accompanying drawings is therefore seen to provide for equalizing the load carried in the vehicle and distributing the shocks of uneven surfaces over which the wheels of the vehicle roll. A safer and more comfortable ride is thus provided for the passengers of a vehicle and the vehicle, so equipped, has a better performance in curves and around corners than vehicles presently in use. The material from which the load distributing system of the present invention is constructed include cold rolled steel, hardened alloys, and other material resistant to bending. Suitable grease fittings are supplied, although not here illustrated. The kingpin assemblies 72 are provided with suitable thrust bearings, not illustrated as not being a part of the invention.

What is claimed is:

1. The combination with a vehicle frame including spaced side members, front and rear end members connecting said side members together, a front wheel assembly positioned below said front end member and operatively connected to said front end member, a rear axle housing positioned below said rear end member, an upstanding compression spring carried by said assembly adjacent each end thereof and by said housing adjacent each end thereof, of a load distributing system operatively connected to the compression springs carried by said assembly and said housing, said system comprising a support arranged longitudinally of each of said side members intermediate the ends thereof and connected at its midpoint to the adjacent side member for rocking movement about a horizontal axis, a lever positioned between said front end member and each of said supports and connected to the adjacent side member for rocking movement about a horizontal axis, each of said levers having one end connected to the adjacent support for movement with the latter and having the other end operatively connected to the adjacent front assembly compression spring, another support arranged longitudinally of said front end member intermediate the ends thereof and connected at its midpoint to said front end member for rocking movement about a horizontal axis, a lever positioned on each side and longitudinally of said front end member support and connected to said front end member for rocking movement about a horizontal axis, each of the levers of said front end member support having one end connected to said front end member support for movement with the latter and having the other end operatively connected to the adjacent front assembly compression spring, another lever positioned between said rear end member and each of said first named supports and connected to the adjacent side member for rocking movement about a horizontal axis, each of said last named levers having one end connected to the adjacent support for movement with the latter and having the other end operatively connected to the adjacent rear axle housing compression spring, another support arranged longitudinally of said rear end member intermediate the ends thereof and connected at its midpoint to said rear end member for rocking movement about a horizontal axis, and a lever positioned on each side and longitudinally of said rear end member support and connected to said rear end member for rocking movement about a horizontal axis, each of the levers of said rear end members support having one end connected to said rear end member support for movement with the latter and having the other end operatively connected to the adjacent rear axle housing compression spring.

2. The combination with a vehicle frame including spaced side members, front and rear end members connecting said side members together, a front wheel assembly positioned below said front end member and operatively connected to said front end member, a rear axle housing positioned below said rear end member, an upstanding compression spring carried by said assembly adjacent each end thereof and by said housing adjacent each end thereof, of a load distributing system operatively connected to the compression springs carried by said assembly and said housing, said system comprising a casing arranged longitudinally of each of said side members intermediate the ends thereof and fixedly secured to said side member, a support positioned within said casing and connected at its midpoint to said casing for rocking movement about a horizontal axis, a lever positioned between said front end member and each of said supports and connected to the adjacent casing for rocking movement about a horizontal axis, each of said levers having one end connected to the adjacent support for movement with the latter and having the other end operatively connected to the adjacent front assembly compression spring, another support arranged longitudinally of said front end member intermediate the ends thereof and connected at its midpoint to said front end member for rocking movement about a horizontal axis, a lever positioned on each side and longitudinally of said front end member support and connected to said front end member for rocking movement about a horizontal axis, each of the levers of said front end member support having one end connected to said front end member support for movement with the latter and having the other end operatively connected to the adjacent front assembly compression spring, another lever positioned between said rear end member and each of said first named supports and connected to the adjacent casing for rocking movement about a horizontal axis, each of said last named levers having one end connected to the adjacent support for movement with the latter and having the other end operatively connected to the adjacent rear axle housing compression spring, another support arranged longitudinally of said rear end member intermediate the ends thereof and connected at its midpoint to said rear end member for rocking movement about a horizontal axis, and a lever positioned on each side and longitudinally of said rear end member support and connected to said rear end member for rocking movement about a horizontal axis, each of the levers of said rear end member support having one end connected to said rear end member support for movement with the latter and having the other end operatively connected to the adjacent rear axle housing compression spring.

3. The combination with a vehicle frame including spaced side members, front and rear end members connecting said side members together, a front wheel assembly positioned below said front end member and operatively connected to said front end member, a rear axle housing positioned below said rear end member, an upstanding compression spring carried by said assembly adjacent each end thereof and by said housing adjacent each end thereof, of a load distributing system operatively connected to the compression springs carried by said assembly and said housing, said system comprising a casing arranged longitudinally of each of said side members intermediate the ends thereof and fixedly secured to said side member, a support positioned within said casing and connected at its midpoint to said casing for rocking movement about a horizontal axis, a lever positioned between said front end member and each of said supports and connected inwardly of one end to the adjacent casing for rocking movement about a horizontal axis, each of said levers having said one end connected to the adjacent support for movement with the latter and having the other end operatively connected to the adjacent front assembly compression spring, another casing arranged longitudinally of said front end member intermediate the ends thereof and fixedly secured to said front end member, a support positioned within the last named casing and connected at its midpoint to said last named casing for rocking movement about a horizontal axis, a lever positioned on each side and longitudinally of said front end member support and connected inwardly of one end to said front end member for rocking movement about a horizontal axis, each of the levers of said front end member support having said one end connected to said front end member support for movement with the latter and having the other end operatively connected to the adjacent front assembly compression spring, another lever positioned between said rear end member and each of said first named supports and connected inwardly of one end to the adjacent casing for rocking movement about a horizontal axis, each of said last named levers having said one end connected to the adjacent support for movement with the latter and having the other end operatively connected to the adjacent rear axle housing compression spring, another support arranged longitudinally of said rear end member intermediate the ends thereof and connected at its midpoint to said rear end member for rocking movement about a horizontal axis, and a lever positioned on each side of and longitudinally of said rear end member support and connected inwardly of one end to said rear end member for rocking movement about a horizontal axis, each of the levers of said rear end member support having said one end connected to said rear end member support for movement with the latter and having the other end operatively connected to the adjacent rear axle housing compression spring.

References Cited in the file of this patent

UNITED STATES PATENTS

| | | |
|---|---|---|
| 1,284,892 | Harrell | Nov. 12, 1918 |
| 2,466,833 | Allen | Apr. 12, 1949 |